US009931712B2

(12) United States Patent
Wang

(10) Patent No.: US 9,931,712 B2
(45) Date of Patent: Apr. 3, 2018

(54) LASER DRILLING AND TREPANNING DEVICE

(75) Inventor: Weimin Wang, North Huntingdon, PA (US)

(73) Assignee: PIM Snow Leopard Inc., San Jose, CA (US)

( * ) Notice: Subject to any disclaimer, the term of this patent is extended or adjusted under 35 U.S.C. 154(b) by 1785 days.

(21) Appl. No.: 13/348,257

(22) Filed: Jan. 11, 2012

(65) Prior Publication Data

US 2013/0175243 A1    Jul. 11, 2013

(51) Int. Cl.
B23K 26/38 (2014.01)
B23K 26/06 (2014.01)
B23K 26/382 (2014.01)

(52) U.S. Cl.
CPC ...... B23K 26/0643 (2013.01); B23K 26/0652 (2013.01); B23K 26/382 (2015.10); B23K 26/389 (2015.10)

(58) Field of Classification Search
CPC .............. B23K 26/0643; B23K 26/386; B23K 26/381; B23K 26/0652
USPC ....................... 219/121.11–121.86
See application file for complete search history.

(56) References Cited

U.S. PATENT DOCUMENTS

| 3,720,454 | A | | 3/1973 | Inderhees |
| 3,818,132 | A | * | 6/1974 | Fowler .......................... 358/480 |
| 4,079,230 | A | | 3/1978 | Miyauchi et al. |
| 4,118,109 | A | | 10/1978 | Crawford et al. |
| 4,209,224 | A | | 6/1980 | Stewart, Jr. |
| 4,355,871 | A | | 10/1982 | Nevyas et al. |
| 4,822,974 | A | | 4/1989 | Leighton |
| 5,043,553 | A | | 8/1991 | Corte et al. |
| 5,223,692 | A | | 6/1993 | Lozier et al. |
| 5,349,399 | A | * | 9/1994 | Sekine ................. A61B 3/1005 351/211 |
| 5,365,288 | A | | 11/1994 | Dewald et al. |
| 5,632,083 | A | | 5/1997 | Tada et al. |
| 5,645,740 | A | | 7/1997 | Naiman et al. |
| 5,837,964 | A | | 11/1998 | Emer et al. |

(Continued)

OTHER PUBLICATIONS

Dr. Arnold Gillner; Helical Drilling Optics Model 3A-532 (laboratory prototype) Operating Instructions; Fraunhofer Institute for Laser Technology ILT; Jul. 18, 2007; Steinbachstrasse, Germany.

(Continued)

*Primary Examiner* — Dana Ross
*Assistant Examiner* — Kuangyue Chen

(57) ABSTRACT

Laser drilling devices are disclosed which include a laser beam source and a laser drilling head. The laser drilling head includes a beam manipulator system in which the only dynamically moving optical element is a mirror. The mirror is dynamically and reciprocally translatable along the direction of the incoming laser beam and is also dynamically and reciprocally tiltable about an axis that is perpendicular to the nominal optical axis of the drilling head. The drilling head also includes a spinnable laser beam rotating system, a simplified compensation system, and a focusing system. The compensation system includes as its only laser beam path shifting optical elements one or two wedge plates which, if two, are fixably rotatable relative to one another in planes which are perpendicular to the nominal optical axis of the laser drilling device.

20 Claims, 3 Drawing Sheets

(56) References Cited

U.S. PATENT DOCUMENTS

| | | | |
|---|---|---|---|
| 6,037,565 A * | 3/2000 | Hackel et al. | 219/121.73 |
| 6,114,651 A * | 9/2000 | Schluter et al. | 219/121.69 |
| 6,252,196 B1 * | 6/2001 | Costin et al. | 219/121.69 |
| 6,355,907 B1 | 3/2002 | Kuehnle et al. | |
| 6,362,454 B1 | 3/2002 | Liu | |
| 6,433,303 B1 | 8/2002 | Liu et al. | |
| 6,444,948 B1 | 9/2002 | Giering et al. | |
| 6,608,278 B1 * | 8/2003 | Xie et al. | 219/121.64 |
| 6,693,255 B2 | 2/2004 | Freiwald et al. | |
| 6,734,390 B1 | 5/2004 | Frye | |
| 6,852,946 B2 | 2/2005 | Groen et al. | |
| 6,864,459 B2 | 3/2005 | Chang et al. | |
| 6,914,214 B2 | 7/2005 | Byrd et al. | |
| 6,974,930 B2 * | 12/2005 | Jense | B23K 26/0846 219/121.73 |
| 7,244,907 B2 | 7/2007 | Hogan | |
| 7,259,354 B2 | 8/2007 | Pailthorp et al. | |
| 7,525,708 B2 * | 4/2009 | Boettcher | 359/202.1 |
| 7,618,415 B2 * | 11/2009 | Kessler et al. | 606/10 |
| 7,656,592 B2 * | 2/2010 | Frangineas | 359/754 |
| 7,772,520 B2 * | 8/2010 | Bushroe | B23K 26/0096 219/121.67 |
| 7,807,944 B2 * | 10/2010 | Akasaka et al. | 219/121.71 |
| 7,812,282 B2 | 10/2010 | Kuhn et al. | |
| 7,842,901 B2 | 11/2010 | Wawers et al. | |
| 2002/0104831 A1 * | 8/2002 | Chang et al. | 219/121.7 |
| 2004/0017560 A1 | 1/2004 | Liu | |
| 2004/0094524 A1 | 5/2004 | Stevens | |
| 2004/0112881 A1 | 6/2004 | Bloemeke et al. | |
| 2004/0118823 A1 * | 6/2004 | Groen et al. | 219/121.69 |
| 2006/0007297 A1 * | 1/2006 | Doi et al. | 347/224 |
| 2006/0266744 A1 * | 11/2006 | Nomaru | 219/121.75 |
| 2009/0045176 A1 * | 2/2009 | Wawers et al. | 219/121.67 |
| 2009/0107585 A1 * | 4/2009 | Sakai et al. | 148/121 |
| 2010/0116796 A1 * | 5/2010 | Jancso et al. | 219/121.67 |
| 2010/0126973 A1 | 5/2010 | Frye | |
| 2010/0219171 A1 * | 9/2010 | Sato et al. | 219/121.75 |
| 2010/0288740 A1 * | 11/2010 | Komiya et al. | 219/121.67 |
| 2011/0233178 A1 * | 9/2011 | Cheng et al. | 219/121.72 |
| 2013/0134140 A1 * | 5/2013 | Pollak et al. | 219/121.67 |
| 2013/0161299 A1 * | 6/2013 | Herrn et al. | 219/121.63 |
| 2014/0332508 A1 * | 11/2014 | Cilia | B23K 26/0652 219/121.64 |

OTHER PUBLICATIONS

Friedrich Dausinger, Femtosecond technology for precision manufacturing: Fundamental and technical aspects, RIKEN Review No. 50: Focused on Laser Precision Microfabrication (LMP 2002), Jan. 2003, Germany, pp. 77-82.

Sushant Dhar, Nishant Saini, R. Purohit; A review on laser drilling and its Techniques, Proceedings: International Conference on Advances in Mechanical Engineering-2006; Dec. 1-3, 2006; Fatehgarh Sahib, Punjab, India (not paginated).

* cited by examiner

LASER DRILLING AND TREPANNING DEVICE

BACKGROUND

Field of the Invention

The present invention relates to devices and methods for laser drilling and trepanning holes in workpieces.

Background of the Invention

In laser machining, a laser beam generation device is used in conjunction with an optical system to direct the laser beam onto a workpiece that is to be machined. The impingement of the laser beam on the workpiece locally melts and/or vaporizes the workpiece material to produce or extend a hole or cut in the workpiece. The location of the laser beam impingement point on the workpiece may be controlled by moving one or both of the laser beam and the workpiece relative to one another to thereby control the geometry of the hole or cut.

In laser drilling, a hole, which can be through or blind, is formed in a workpiece by directing the laser beam at a preselected spot on the workpiece. The focus point of the beam may be adjusted during the drilling to correlate with the current depth of the hole. Three common techniques for laser drilling are single pulse drilling, which uses a single pulse of the laser beam to make the hole, percussion drilling, which uses multiple pulses of the laser beam delivered to the same spot, and helical drilling, which uses multiple pulses applied in a descending helical-like pattern to form a circular or non-circular hole. In laser trepanning, the point of incidence of the laser beam on the workpiece is manipulated so as to describe and cut a geometric or irregular figure, e.g., a circle or an irregular polygon, into or through the workpiece. In both laser drilling and laser trepanning, the profile of the cut in the through-thickness direction may be controlled by manipulating the incident angle of the laser beam to cut, for example, conical, funnel-shaped, or double-conical holes. (See, e.g., FIGS. 1-3 and 9 U.S. Pat. No. 5,043,553).

Laser drilling and trepanning have become inexpensive alternatives, in many cases, to mechanical machining methods. Laser drilling or laser trepanning may be used with almost any kind of workpiece material, e.g., ceramics, metals, glass, gemstones, rubber, polymers, and composite materials. These methods permit tight tolerance manufacturing specifications to be met in a wide variety of industries.

Undesired localized thermal deformation of the workpiece may be caused by the heat input due to the irradiating of the workpiece with the laser beam. Such deformation is especially a problem when the workpiece has poor thermal conductivity and a thin through thickness. It is also a problem when the laser drilling or trepanning is being used to do very accurate machining of small features. Various schemes have developed to avoid localized thermal deformation. One is to use short or ultra-short pulse lasers, i.e., in the femtosecond and picosecond pulse ranges, respectively, so that the amount of energy delivered by each laser pulse is small and has a chance to partially dissipate before the next pulse is delivered. Another scheme is to dynamically manipulate the shape and location of the laser beam impingement point upon the target so that the cutting or hole making is performed in a series of overlapping locations which eventually combine to make the overall cut or hole.

An example of a laser drilling and trepanning device (hereinafter and in the appended claims referred to as a "laser drilling device") utilizing both of these schemes is described in U.S. Pat. No. 7,842,901 to Wawers et al. The laser drilling device described in that patent comprises a laser beam source, a laser beam manipulator system, an image rotator system, a compensating system, and a focusing system. The laser beam manipulator system has a mirror that is linearly translatable in the direction of the incoming laser beam and a wedge plate that is pivotable about an axis that is perpendicular to the nominal optical axis of the laser drilling device. The image rotator element of the image rotator system may be a radiation-transmitting prism, such as a Dove prism or an Abbe-Koenig prism, or a reflecting system, such as a K-mirror arrangement. The image rotator system is configured to spin about the nominal optical axis of the laser drilling device at rates up to about 500 revolutions per minute during operation (which causes the laser beam to rotate at twice this rate), and may optionally include half-wavelength plate to reduce polarization induced variations of the incoming the laser beam. The compensating system includes a parallel displacement unit, such as a plane-parallel plate, and a pair of wedge plates, all of which are mounted to be able to be tilted on respective axes which are perpendicular to the nominal optical axis of the laser drilling device. Additionally, the two wedge plates can be rotationally adjusted relative to one another about axes which are perpendicular to the nominal optical axis of the laser drilling device. The compensating unit is configured so as to spin about the nominal optical axis of the laser drilling device with the image rotator system. The focusing system may be composed of one or more focusing lenses which may be mounted to translate along the nominal beam axis of the laser drilling device so as to permit continuous adjustment of the laser beam focus during use. In operation, the laser beam emanates from the laser beam source and may pass through an optional stationary quarter-wavelength plate (to convert a linearly polarized laser beam into a circularly polarized laser beam) and then enters the beam manipulator system where it is reflected from the mirror to a direction which is substantially parallel to the optical axis of the laser drilling device and then through the wedge plate. The laser beam then passes through the half-wavelength plate (if present) and then through the image rotator system. The spinning of the image rotator system acts to spin the laser beam about the laser beam's optical axis so as to compensate for any asymmetry the incoming laser beam may have and also causes the laser beam to rotate a preselected distance around the rotation axis of the image rotator system (which coincides with the nominal optical axis of the laser drilling device). The laser beam then passes through the three elements of the compensating system. Prior to use, the positions of these three elements are adjusted and locked into place so as to compensate for any manufacturing defects in the image rotator which would cause the laser beam to vary from its intended position. After exiting the compensating system, the laser beam passes through the focusing system and then onto the workpiece. The impingement point of the laser beam upon the workpiece is adjusted during use by dynamically moving the two components of the beam manipulator, i.e., the mirror and the wedge plate. The mirror is dynamically translated along the direction of the incoming laser beam to adjust the angle at which the laser beam impacts the workpiece and the wedge plate is dynamically tilted about its mounting axis so as to adjust the distance of the laser beam from the optical axis of the laser drilling device. Through the use of these controls, the shape of the laser cut as well as its contour can be controlled.

Although the prior art laser drilling devices, e.g., those taught by U.S. Pat. No. 7,842,901, produce good results, improvements are still desirable. For example, it is believed that higher laser beam rotation speeds would lessen the chance of thermal deformation when cutting very small features in thin materials, e.g., holes with diameters in the range of about 100 microns to 1 millimeter. Additionally, it would be advantageous to simplify the alignment of the laser beam in the device prior to use. It would also be advantageous to reduce the number of optical elements that need to be moved in the device in order to manipulate the incident point of the laser beam on the workpiece.

SUMMARY OF THE INVENTION

The present invention provides laser drilling devices which are able to provide one or more of the foregoing desired improvements. In one aspect of the invention, there are provided laser drilling devices which include a laser beam source and a laser drilling head. The laser drilling head comprises a beam manipulator system in which the only dynamically moving optical element is a mirror. The mirror is dynamically and reciprocally translatable along the direction of the incoming laser beam and is also dynamically and reciprocally tiltable about an axis that is perpendicular to the nominal optical axis of the drilling head. The drilling head also includes a spinnable laser beam rotating system, a simplified compensation system, and a focusing system. The compensation system includes as its only laser beam path shifting optical elements one or two wedge plates which, if two, are fixably rotatable relative to one another in planes which are perpendicular to the nominal optical axis of the laser drilling device.

In another aspect, the present invention provides a laser drilling head that is usable with a laser source.

BRIEF DESCRIPTION OF THE DRAWINGS

The criticality of the features and merits of the present invention will be better understood by reference to the attached drawings. It is to be understood, however, that the drawings are designed for the purpose of illustration only and not as a definition of the limits of the present invention. Unless otherwise specified, the drawings are not to scale.

DESCRIPTION OF PREFERRED EMBODIMENTS

In this section, some preferred embodiments of the present invention are described in detail sufficient for one skilled in the art to practice the present invention. It is to be understood, however, that the fact that a limited number of preferred embodiments are described herein does not in any way limit the scope of the present invention as set forth in the appended claims. It is also to be understood that whenever a range of values is presented, the range is to be construed as disclosing its endpoints and every point therebetween as if each point was expressly described.

Figure 1:
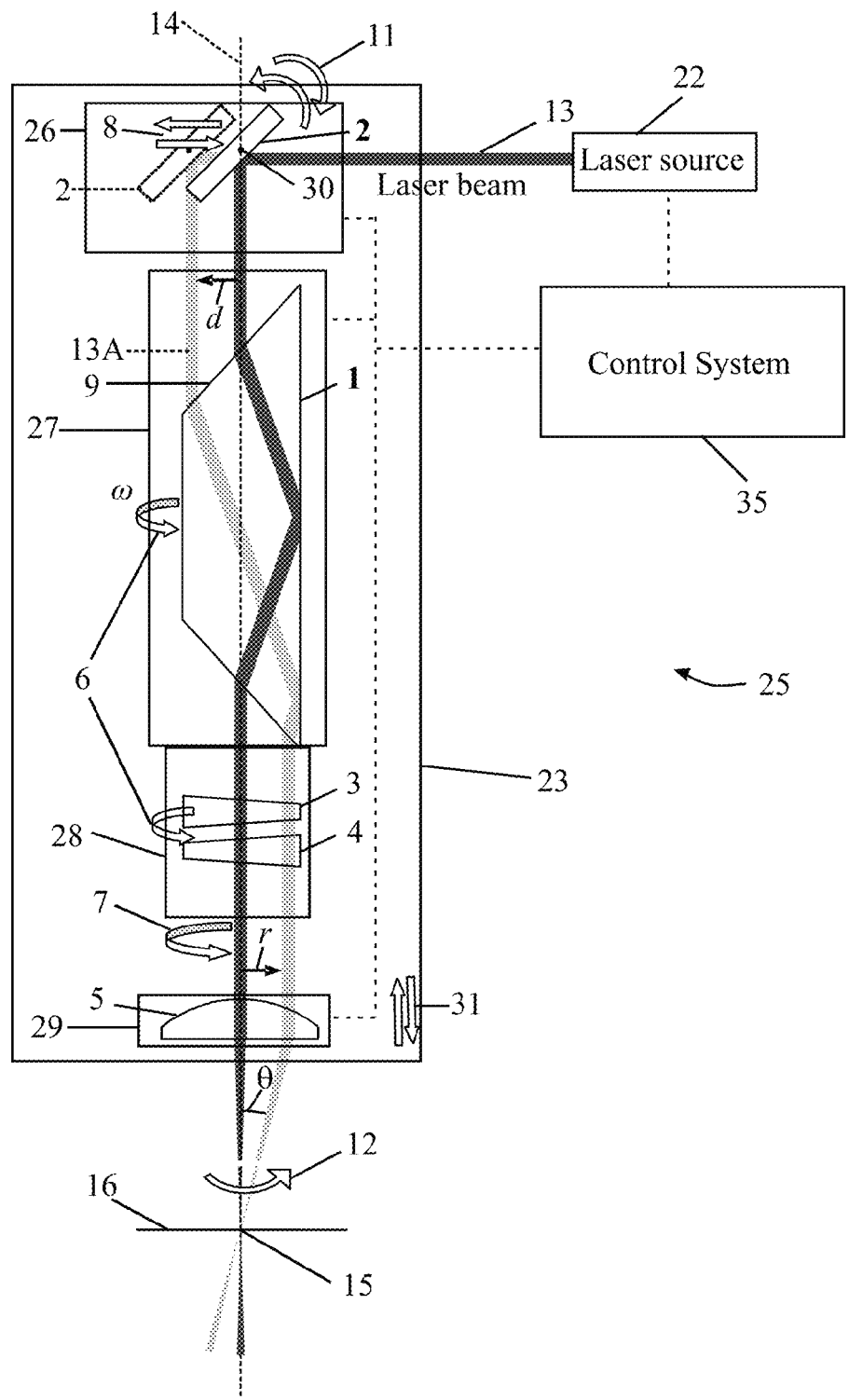
FIG. 1 is a schematic drawing of the optical components of a laser drilling device in accordance with an embodiment of the present invention.

Referring to FIG. 1, there is shown a laser drilling device 25 according to an embodiment of the present invention. The laser drilling device 25 includes a laser source 22, which produces a laser beam 13, and a laser drilling head 23. The laser drilling head 23 comprises a laser beam manipulator system 26, a laser beam rotating system 27, a compensation system 28, and a focusing system 29. During operation, a laser beam 13 is produced by the laser source 22. The laser beam 13 passes through the laser beam manipulator system 26, then the laser beam rotating system 27, the compensation system 28, and the focusing system 29 after which it impinges upon the surface of the workpiece 16 at a preselected location. Although in this embodiment the compensation system 28 is located on the optical exit side of the laser beam rotating system 27, in other embodiments of the present invention the compensation system 28 may be located on the optical entrance side of the laser beam rotating system 27.

The laser source 25 may be any type of laser system that is capable of producing a laser beam of sufficient power, coherency, pulse width, pulse repetition time, and wavelength to be compatible with performing the desired machining operations upon the selected workpiece. For example, the laser source 26 may be a 25 Watt picosecond green laser of 532 nanometer wavelength for drilling holes in the range of 0.1 to 1 millimeters in diameter. For drilling holes in the range of 1 to 5 millimeters in diameter, visible lasers and infrared lasers of wavelengths such as 1024 nanometers and 1550 nanometers with pulse width in the range from nanoseconds to milliseconds and power levels in the 25 to 4,000 Watt range may be used. As those skilled in the art would realize, the optical components used in the laser drilling head 23 must be selected to be compatible with the laser source so as to avoid damaging those components during operation.

The beam manipulator system 26 includes a mirror 2. The mirror 2 is the only dynamically movable optical component of the laser beam manipulator system 26. In the embodiment shown in FIG. 1, the mirror 2 is dynamically and reciprocally translatable along the direction of the incoming laser beam 13 as is indicated by the arrows 8. The mirror 2 is also dynamically and reciprocally tiltable around a first physical or virtual axis 30 which is perpendicular to the nominal optical axis 14 of the laser drilling head 23. For alignment purposes, the mirror 2 in this embodiment, may also be tilted and locked in place around a second axis that is perpendicular to the first axis 30.

Figure 2:
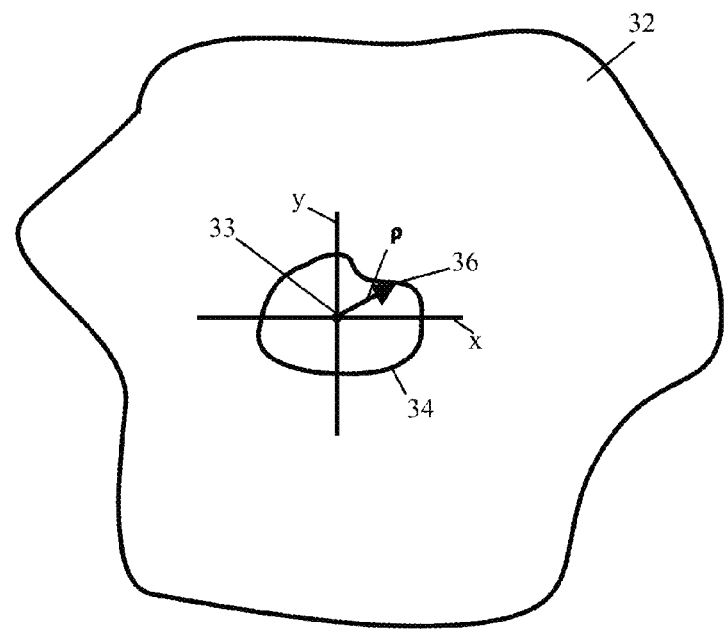
FIG. 2 is schematic drawing showing a depiction of a cut on a surface of a workpiece made by an embodiment of the present invention.

The mirror 2 is provided with support and deflection systems for moving the mirror 2 during the operation of the laser drilling device 25. Such systems are known in the art and not described herein. The linear motion of the mirror 2, e.g., from a location where its axis 30 intersects the nominal optical axis 14 to a second position a distance d away as shown by the solid and outlined depictions of the mirror 2, moves the laser beam 13 from its initial path along the nominal optical axis 14 to a new position indicated by laser beam 13A which is a distance d away from the nominal optical axis 14. This has the effect of moving the laser beam 13A after it exits the compensation device 28 a distance r away from the nominal optical axis 14 and consequently, after passing through the focusing system, of determining the angle of incidence θ of the laser beam 13A upon the surface of workpiece 16 (assuming the surface of the workpiece 16 is essentially perpendicular to the nominal optical axis 14) and, consequently, the contour of the hole that is cut into the workpiece 16. The dynamic tilting of mirror 2 is indicated by arrows 11. The amount of tilting of the mirror 2 determines the angle of incidence at which the laser beam 13 (or 13A) strikes a first optical surface of the optical rotating system, e.g., surface 9 of Dove prism 1. This, in turn, determines the distance ρ away (see FIG. 2 for clearer indication of distance ρ) from the intersection point on the surface of the workpiece 16 of the nominal optical axis 14 of the laser drilling head 23 that the laser beam 13 (or 13A) strikes the surface of the workpiece 16.

The present invention also includes embodiments wherein the mirror 2 is dynamically and reciprocally tiltable about a second physical or virtual axis that is perpendicular to the first axis 30. In some embodiments, this tiltability about the second axis is provided instead of the tiltability around the first axis 30 as described above, while in other embodiments this tiltability is in addition to the tiltability around the first axis 30. Dynamically tilting the mirror 2 around this second axis permits the cut profile to take the shape of a hyperbolic curve.

In some embodiments of the present invention multiple mirrors, some of which may be stationary and others of which are dynamically and reciprocally movable, may be used in place of the mirror 2 such that together they perform the translation and rotational functions described above for mirror 2. However, the use of multiple mirrors adds complexity to the laser drilling head 23 and so is less desirable than the use of a single mirror, e.g., the mirror 2.

The laser beam rotating system 27 comprises one or more image rotation elements, such as the Dove prism 1. Each image rotation element is spinnably supported so that it has an axis of rotation that coincides with the nominal optical axis 14 of the laser drilling head 23. One manner of providing such a support is by mounting the image rotation element within a hollow shaft motor that has its axis of rotation aligned with the nominal optical axis 14. In some embodiments, as described below, spinning the image rotation element around the nominal optical axis 14 has the effect of rotating the laser beam 13 (or 13A) about its own optical axis, as is indicated in FIG. 1 by arrow 12 with regard to laser beam 13. When the optical axis of the laser beam 13 does not coincide with the nominal optical axis 14 of the laser drilling head 23, as is the case for laser beam 13A, spinning the image rotation element (e.g., the Dove prism 1) permits the laser beam 13A to traverse around the nominal optical axis at radius ρ upon the surface of the workpiece 16. The mounting of the image rotation element (or elements) also permits the image rotation element (or elements) to be adjusted and locked into place during a pre-operation alignment setup procedure.

The image rotation element (or elements) may chosen to make the angular speed of rotation 7 of the laser beam 13 (or 13A) to be the same as the angular speed of rotation 6 of the image rotation element (or elements), as would be the case if a set of wedge plates were used as the image rotation elements. However, such choices have the disadvantage that the laser beam does not spin about its own optical axis. Preferably, the element (or elements) is chosen so that the angular speed of rotation 7 of the laser beam 13 (or 13A) is higher than that of the angular speed of rotation 6 of the image rotation device itself. For example, when the image rotation element is a prism (e.g., a Dove prism 1 or an Abbe-Koenig prism) or a mirror arrangement (e.g., a K-mirror arrangement), the angular speed of rotation 7 of the laser beam 13 (or 13A) is twice the angular speed of rotation 6 of the image rotation element itself.

The compensation system 28 has as its only laser beam path shifting optical elements two wedge plates 3, 4 fixedly mounted to synchronously spin with the image rotation element, e.g., the Dove prism 1. The synchronous spinning may be accomplished, for example, by operably connecting the laser beam rotating system 27 and the compensation system 28 either mechanically or by providing separate spin drives for the two systems which are driven at the same angular rotation speeds. The synchronous spinning may also be accomplished by any means known in the art.

Although the wedge plates 3, 4 are fixed in place relative to each other and the laser beam rotating system 27 during the operation of the laser drilling head 23, they are mounted so as to be adjustable with relation to one another during a pre-operation alignment setup procedure of the laser drilling head 23. This adjustability allows the wedges 3, 4 to be set so that, in combination, they substantially cancel out the manufacturing optical defects and the mounting irregularities of the optical element or elements of the laser beam rotating system 27. The mounting of the wedge plates 3, 4 may be configured to permit both wedge plates 3, 4 to be adjusted and then locked into place. Alternatively, the mounting may be configured so that one of the wedge plates 3, 4 is fixed and only the other one is fixably adjustable with its adjustability confined to enabling the wedge plate to turn around the nominal optical axis 14 of the laser drilling head 23 a sufficient amount to cancel out the aforementioned deficiencies before it is locked into place.

In some embodiments of the present invention, only a single wedge plate, e.g., wedge plate 3, is used instead of a set of two wedge plates as the only laser beam shifting optical element of the compensation system, e.g., compensation system 28. These embodiments are less preferred because it is necessary to select the single wedge plate carefully so that, by itself, the wedge plate, e.g., wedge plate 3, can cancel out the manufacturing optical defects and mounting irregularities of the optical element or elements of the laser beam rotating system 27.

The focusing system 29 comprises one or more focusing lenses, e.g., lens 5. The lens or lenses are mounted so that they may be adjusted during a pre-operation alignment setup procedure both with regard to tilt about axes perpendicular to the nominal optical axis 14 of the laser drilling head 23 and with regard to position along the nominal optical axis 14. In some embodiments of the present invention, the lens or lenses are mounted so that they are immovable during operation. More preferably, the lens or one or more of the lenses of the focusing system 29 are dynamically and reciprocally translatable along the nominal optical axis 14, as indicated by arrows 31, so as permit the depth of the focus point with respect to the surface of the workpiece 16 to be dynamically and reciprocally adjustable.

During the pre-operation alignment setup procedure, the non-dynamically controlled features of the components of the laser drilling device 25 (or laser drilling head 23) are adjusted and then locked in place so that the laser beam output from the laser beam rotating system 27 is collinear with the nominal optical axis 14 (and mechanical rotation axis of the laser beam rotating system 27) and the laser beam 13 is focused on the intersection point 15 of the nominal optical axis 14 with the surface of the workpiece 16. As part of this alignment procedure, the mirror 2 is moved to the position in which is it depicted with solid lines in FIG. 1. When the mirror 2 is moved to the position in which it is depicted with dashed lines in FIG. 1, the angle of incidence of the laser beam 13A with the surface of workpiece 16 (assuming the surface of the workpiece 16 is essentially perpendicular to the nominal optical axis 14) is changed from zero (as it was for laser beam 13) to θ, but the impingement point of the laser beam 13A is unchanged from that of laser beam 13.

During operation, the laser beam rotating system, e.g., laser beam rotating system 27, is rotated at a predetermined angular velocity or over a range of predetermined angular velocities as the particular machining circumstances warrant. Higher angular velocities are desirable when the workpiece and cutting geometries make localized thermal deformation more likely. In embodiments of the present invention wherein the laser beam rotating system causes the laser beam angular velocity to be twice that of the mechanical angular speed of rotation of the laser beam rotating system, angular velocities of the laser beam about the nominal optical axis of the laser drilling head are typically between zero and 5,000 revolutions per minute. In some preferred embodiments of the present invention, the angular velocity of the laser beam about the nominal optical axis of the laser drilling head are in the range of between zero and 10,000 revolutions per minute. In this regard, the inventor of the present invention has found the surprising result that the present invention may be used at laser beam angular velocities much higher than the 1,000 revolutions per second described in aforementioned U.S. Pat. No. 7,842,901 and at the same time provide excellent controllability of the laser cut with fewer optical components and fewer dynamically controllable optical elements.

The laser drilling devices and laser drilling heads of the present invention may be used to make any desired cutting pattern in cases wherein the laser drilling device (or laser drilling head) and the workpiece are configured to be controllably movable in relation to one another. When this is the case, the devices that control the relative motion of the workpiece and the laser drilling device (or the laser drilling head) can be used alone or in conjunction with the dynamically controllable elements of the laser drilling device (or laser drilling head) to make the desired cutting pattern.

In cases wherein the cutting is done at selected locations on the workpiece while the workpiece and the laser drilling device (or laser drilling head) are maintained in fixed positions with regard to one another, the shape and contour of the cut are controlled by the dynamically controlled elements of the laser drilling device (or laser drilling head). In such cases, the desired geometry of the cut (which may be symmetrical or non-symmetrical) is controlled by moving the mirror of the laser beam manipulator, e.g. the mirror 2 of FIG. 1, and by changing the depth of focus of the focusing system, e.g., the focusing system 29 of FIG. 1, in the manners described above. For example, referring now to FIG. 2, there is shown a schematic of location on a workpiece surface 32 onto which a pair of coordinate axes x, y have been superimposed. The nominal optical axis of the laser drilling device (or laser drilling head) intersects the workpiece surface 32 at the intersection 33 of the axes x, y. By dynamically tilting the mirror, the distance ρ of each impingement point, e.g., impingement point 36, of each laser pulse is controlled to produce the cut 34 as the laser beam is being planetarily rotated by the spinning of the image rotating system.

Referring again to FIG. 1, the laser source 22, the laser beam manipulator system, the laser beam rotation system, and the focusing system are operably connected to the control system 35. The control system 35 comprises one or more computers and/or microprocessors programmed to provide signals to control and/or coordinate the operations of the laser source 22 and the various components of the drilling head 23 during the laser cutting operation. The control system 35 may be included in whole or in part as a component of the laser drilling system 25 or of the laser drilling head 23. Alternatively, all or part of the control system 35 may be an ancillary control system that is interfaced with one or more of the laser source 22 and the laser drilling head 23.

Figure 3:
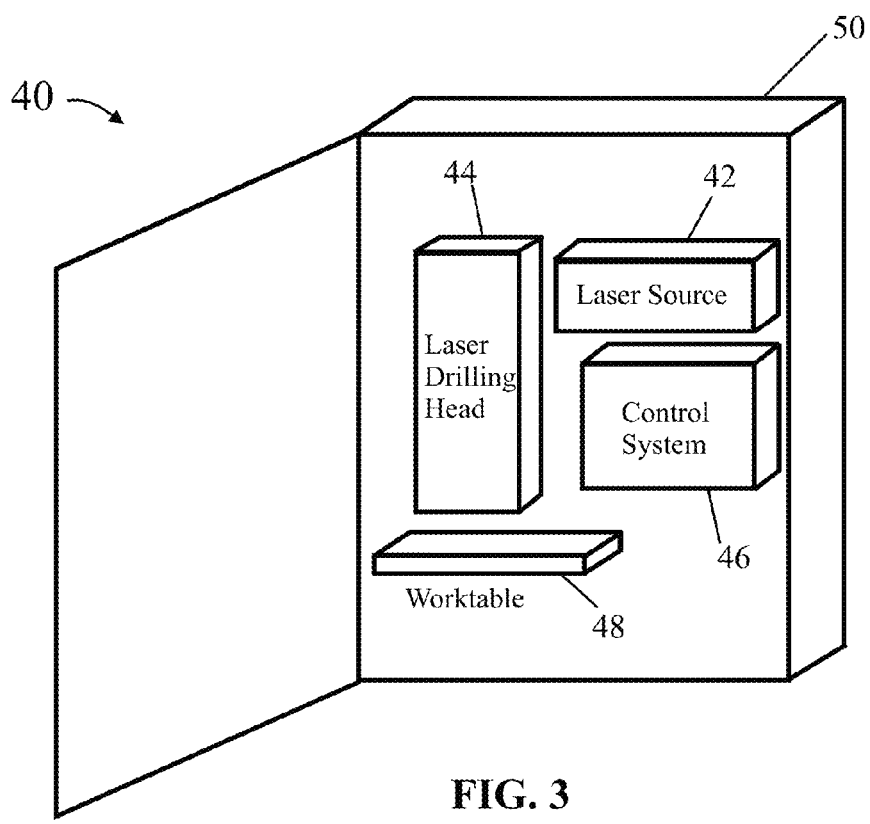
FIG. 3 is a schematic drawing of an embodiment of a laser drilling device in accordance with an embodiment of the present invention.
Figure 4:
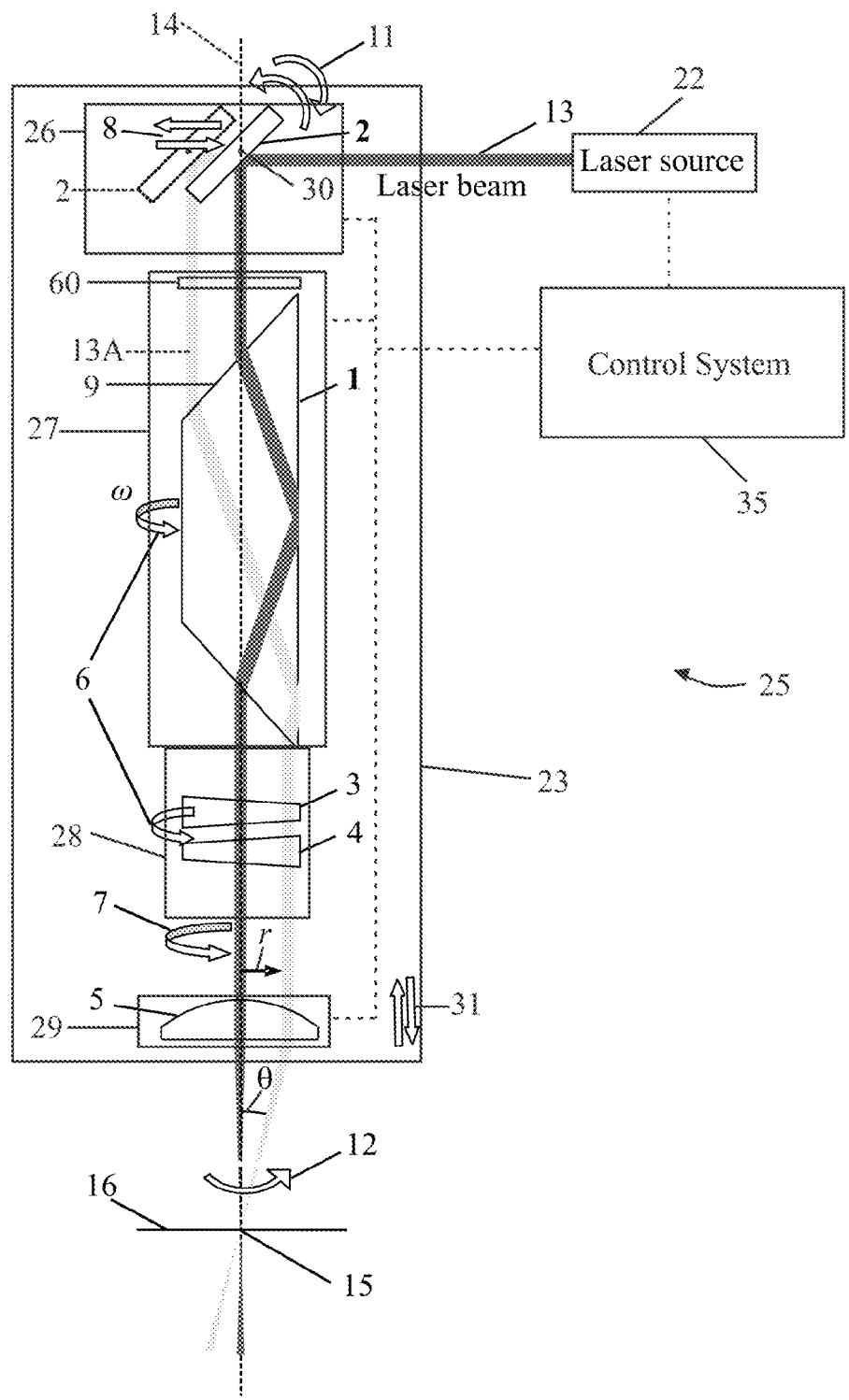
FIG. 4 is a schematic drawing of the optical elements of a laser drilling device in accordance with an embodiment of the present invention which includes a half wavelength plate included on the entrance side of the image rotating system.

In addition to the elements described with regard to FIG. 1, embodiments of the present invention may include additional elements. For example, in some embodiments of the present invention fractional wavelength plates are inserted into the laser beam path at one or more locations to adjust the polarity of the laser beam. For example, a half wavelength plate may be included on the laser beam entrance side of the image rotating system, e.g. half wavelength plate 60 as shown in FIG. 4. Another example is inserting a quarter wavelength plate in the laser beam path between the laser source and the mirror of the laser beam manipulator system. In some of embodiments of the present invention, elements such as structural supports for the laser source, laser drilling head, the control system, and/or the workpiece are provided. Referring to FIG. 3, there is shown a laser drilling system 40 in conjunction with an embodiment of the present invention. The laser drilling system 40 comprises a laser source 42, a laser drilling head 44, a control system 46, a worktable for fixedly and/or movably supporting a workpiece, and a cabinet 50 for enclosing and supporting the other named components during the operation of the laser drilling system 40.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

What is claimed is:

1. A laser drilling device comprising:
   a) a laser source; and
   b) a laser drilling head having a nominal optical axis and
      i) a beam manipulator system having a mirror as its sole dynamically controllable optical element, the mirror being adapted, in response to one or more signals from a control system, to dynamically and reciprocally translate along the path of a laser beam coming from the laser source and to dynamically and reciprocally tilt around a first axis, the first axis being perpendicular to the nominal optical axis,
      ii) a laser beam rotating system having an image rotation element, the image rotation element being spinnably supported to permit the image rotation element to rotate about the nominal optical axis and, in response to one or more signals from the control system, being adapted to spin about the nominal optical axis at a preselected angular speed;
      iii) a compensation system comprising a first wedge plate and a second wedge plate as its only laser beam path shifting optical elements, the first wedge plate being spinnably supported to permit the first wedge plate to rotate about the nominal optical axis independently from the second wedge plate, and adapted to rotate synchronously with the image rotation element, and
      iv) a focusing system comprising a lens;

wherein during the operation of the device, the laser beam coming from the laser source passes through the laser drilling head to impinge upon a workpiece at an impingement point, the impingement point at any given instant of time being determined by the position of the mirror, the angular speed of the image rotation element and the first wedge plate, and the lens.

2. The laser drilling device of claim 1, wherein the lens is mounted to dynamically and reciprocally translate along the nominal optical axis.

3. The laser drilling device of claim 1, the second wedge plate being spinnably supported to permit the second wedge plate to rotate about the nominal optical axis independently from the first wedge plate, and adapted to rotate synchronously with the image rotation element.

4. The laser drilling device of claim 3, wherein only one of the first and second wedge plates is rotatably adjustable about the nominal optical axis.

5. The laser drilling device of claim 1, wherein the mirror is also adapted to dynamically and reciprocally tilt about a second axis, the second axis being perpendicular to the first axis.

6. The laser drilling device of claim 1, wherein the image rotation element is one selected from the group consisting of a prism and a mirror arrangement.

7. The laser drilling device of claim 1, wherein the image rotation element is a Dove prism.

8. The laser drilling device of claim 1 further comprising at least one fractional wavelength plate positioned in the laser beam path to adjust the polarity of the laser beam.

9. The laser drilling device of claim 1, wherein the laser beam rotating system is adapted to rotate the laser beam about the nominal optical axis at an angular speed that is greater than 1,000 revolutions per second.

10. The laser drilling device of claim 1, further comprising at least one of an enclosure cabinet and a worktable.

11. A laser drilling head having a nominal optical axis and comprising:
   i) a beam manipulator system having a mirror as its sole dynamically controllable optical element, the mirror being adapted, in response to one or more signals from a control system, to dynamically and reciprocally translate along the path of a laser beam coming from a laser source and to dynamically and reciprocally tilt around a first axis, the first axis being perpendicular to the nominal optical axis,
   ii) a laser beam rotating system having an image rotation element, the image rotation element being spinnably supported to permit the image rotation element to rotate about the nominal optical axis and, in response to one or more signals from the control system, being adapted to spin about the nominal optical axis at a preselected angular speed;
   iii) a compensation system comprising a first wedge plate and a second wedge plate as its only laser beam path shifting optical elements, the first wedge plate being spinnably supported to permit the first wedge plate to rotate about the nominal optical axis independently from the second wedge plate, and adapted to rotate synchronously with the image rotation element, and
   iv) a focusing system comprising a lens;
   wherein during the operation of the device, the laser beam coming from the laser source passes through the laser drilling head to impinge upon a workpiece at an impingement point, the impingement point at any given instant of time being determined by the position of the mirror, the angular speed of the image rotation element and the first wedge plate, and the lens.

12. The laser drilling head of claim 11, wherein the lens is mounted to dynamically and reciprocally translate along the nominal optical axis.

13. The laser drilling head of claim 11, the second wedge plate being spinnably supported to permit the second wedge plate to rotate about the nominal optical axis independently from the first wedge plate, and adapted to rotate synchronously with the image rotation element.

14. The laser drilling head of claim 13, wherein only one of the first and second wedge plates is rotatably adjustable about the nominal optical axis.

15. The laser drilling head of claim 11, wherein the mirror is also adapted to dynamically and reciprocally tilt about a second axis, the second axis being perpendicular to the first axis.

16. The laser drilling head of claim 11, wherein the image rotation element is one selected from the group consisting of a prism and a mirror arrangement.

17. The laser drilling head of claim 11, wherein the image rotation element is a Dove prism.

18. The laser drilling head of claim 11 further comprising at least one fractional wavelength plate positioned in the laser beam path to adjust the polarity of the laser beam.

19. The laser drilling head of claim 11, wherein the laser beam rotating system is adapted to rotate the laser beam about the nominal optical axis at an angular speed that is greater than 1,000 revolutions per second.

20. The laser drilling head of claim 11, further comprising at least one of an enclosure cabinet and a worktable.

* * * * *